May 15, 1962 T. C. SEBASTIAN 3,034,387
BAND CLEANING DEVICE
Filed Nov. 25, 1960
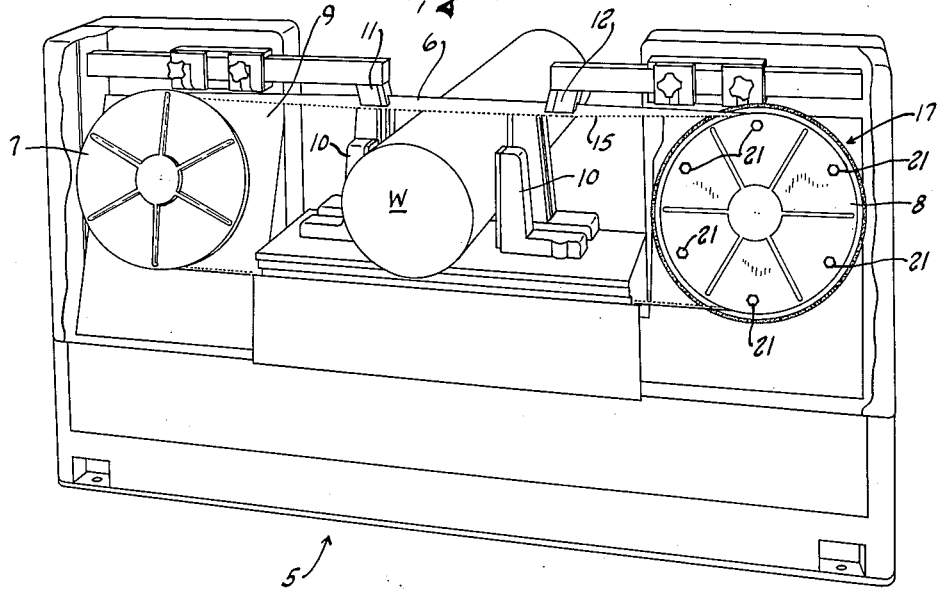
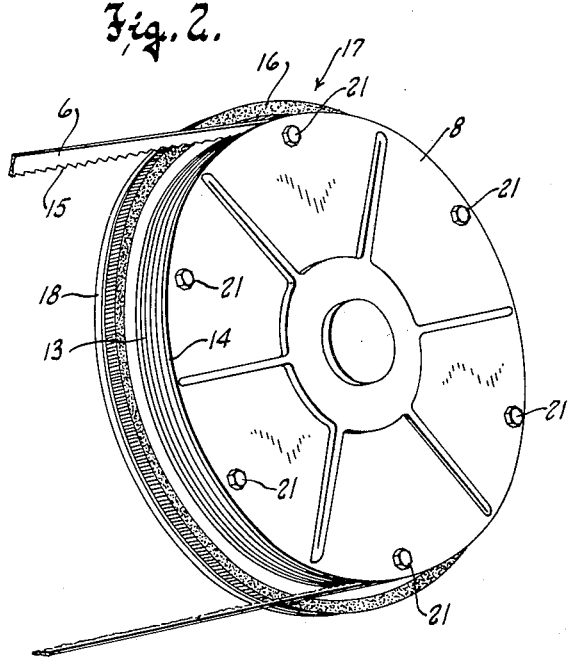
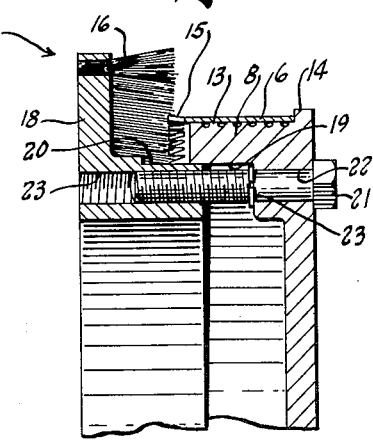
Inventor
Thomas C. Sebastian
By
Attorney

United States Patent Office 3,034,387
Patented May 15, 1962

3,034,387
BAND CLEANING DEVICE
Thomas C. Sebastian, Shakopee, Minn., assignor to Continental Machines, Inc., Savage, Minn., a corporation of Minnesota
Filed Nov. 25, 1960, Ser. No. 71,611
9 Claims. (Cl. 83—168)

This invention is concerned with the problem of cleaning chips from the blades of metal cutting band saws.

Although the need for cleaning the teeth of the blades is encountered in practically all band sawing machines, the problem is particularly serious in metal cutting cutoff saws, such as that illustrated in Patent No. 2,898,669, since the blades of these saws cut through the metal at a very fast rate and thus carry a large quantity of chips with them as they leave the work. These chips should be removed from the band before it reenters the work, for unless the teeth are clean and not encumbered by an accumulation of chips, the saw blade will not perform satisfactorily.

Many different expedients have been employed in the past to rid the saw blade of the chips adhering thereto. Air blasts and streams of coolant liquid have been directed against the saw blade, and brushes have been used. But all these different band cleaning devices have left something to be desired. Having the band travel through a brush or moving a brush transversely of the band, was probably the most effective method heretofore employed, but the brushes wore out so fast and had to be replaced so often that the operators of the machines soon resorted to manual cleaning of the blade.

With the foregoing objections to existing blade cleaning devices in mind, it is an object of the present invention to provide an improved band cleaning device which utilizes brush means for the purpose, but in a way which eliminates the excessive wear heretofore experienced.

More specifically, it is an object of this invention to provide a brush-type band cleaner especially adapted for use with band sawing machines to clean accumulated chips from the toothed edge of the saw blade, wherein the brush rotates with the pulley over which the saw blade passes directly after it leaves the work, and is so located thereon that its bristles have brushing engagement with the blade as it rides onto and again as it leaves the pulley.

It is also an object of this invention to provide the pulley of a band saw with a band cleaning brush so mounted thereon that the extent of brushing engagement with the band as it rides onto and leaves the pulley is readily adjustable, and wherein wear on the brush bristles may be compensated by adjusting the position of the brush on the pulley.

With these and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention, constructed according to the best mode so far devised for the practical application of the principles thereof, and in which:

FIGURE 1 is a perspective front view of a cutoff machine like that of Patent No. 2,898,669 equipped with the band cleaning device of this invention;

FIGURE 2 is a perspective view of the downstream pulley over which the blade passes after it leaves the work, equipped with a band cleaning brush in accordance with this invention; and FIGURE 3 is an enlarged fragmentary cross sectional view through the rim portion of the pulley and brush mounted thereon, to illustrate particularly the manner in which the position of the brush on the pulley may be adjusted.

Referring now particularly to the accompanying drawing, the numeral 5 designates the base of a cutoff saw like that of Patent No. 2,898,669, wherein an endless saw blade 6 is trained about horizontally spaced pulleys 7 and 8, to have its top stretch travel across the work zone of the machine. To this end at least one of the pulleys is power driven. The pulleys 7 and 8 are carried by a movable head or frame 9 which is mounted for translatory vertical motion to carry the top stretch of the saw blade which, in this machine, constitutes the work performing or cutting stretch, downwardly through the work zone as the head or frame descends. In this manner, the top stretch of the saw blade is caused to cut through the bar or other work W which is held in place by vise jaws 10.

The top cutting stretch of the endless saw blade is firmly guided and held in a vertical plane by a pair of saw guides 11 and 12, rigidly mounted at opposite sides of the work zone. As the blade 6 leaves the work, it carries with it large quantities of chips which must be removed before the blade reenters the work, and preferably before the band rides onto the downstream pulley 8.

As best shown in FIGURE 3, this pulley has a rim 13 with a flange 14 projecting therefrom at its rear edge and against which the back edge of the saw blade bears, so that the flange supports the band against rearward edgewise displacement. In the machine illustrated, the pulley rim is "naked," i.e. devoid of any tire, but has a series of parallel grooves as in the pulley of Patent No. 2,865,412, to improve traction between the pulley and the blade. Since there is no rubber tire on the pulley rim, the toothed front edge 15 of the band projects beyond the adjacent front edge of the pulley rim, but if the pulley had a rubber tired rim, the toothed edge of the band would not have to project beyond the adjacent edge of the pulley rim. In either event, the toothed edge of both the upper and lower stretches of the blade, which of course are tangent to the pulley rim, pass transversely through the bristles 16 of a brush, indicated generally by the numeral 17.

The brush 17 is carried by the pulley and has its bristles 16 arranged in a circle and all facing in the same direction—towards the rim of the pulley. The bristles are mounted in a ring 18 which is preferably formed of metal and is telescopingly received within the pulley rim. To enable the ring 18 to be freely moved in or out with respect to the pulley, the inner surface 19 of the pulley rim is a smooth uniform diameter bore of a size to freely slidably receive the mounting portion 20 of the ring.

The brush is constrained to turn with the pulley and is held in a definite axial position with respect to the rim of the pulley by a plurality of screws 21 freely rotatably received in holes 22 in the pulley and held against endwise movement by the heads of the screws and snap rings 23 engaged in grooves in the screws. Obviously, by turning the screws, which are threaded into holes 23 in the ring 18, the brush may be moved axially in or out with respect to the pulley, so that the circle of brush bristles may overlie that portion of the saw blade on the pulley rim to any degree desired.

Hence, as the pulley rotates and carries the brush with it, the brush bristles are swept transversely across the toothed edge of the tangent stretches of the saw blade, to thereby effectively sweep chips and other extraneous matter from between the teeth. At the top stretch of the band, the brush moves from the inside towards the outside of the blade, and at the bottom stretch the brush traverses the blade from the outside toward the inside. This reversal of brushing action assures the utmost effectiveness.

It will also be clear that by this arrangement wear on the brush bristles is reduced to a minimum, since a new portion of the brush is constantly being brought into brushing engagement with the band to be cleaned.

From the foregoing description, taken in connection with the accompanying drawing, it will be readily apparent to those skilled in this art, that this invention solves a problem which has confronted manufacturers of band saws for a very long time, and that it does so in a most effective and efficient manner.

It will also be evident that, although the invention is particularly useful in cleaning the toothed edge portions of saw blades in metal cutting band saws, it is equally useful in any situation where a band passing over a pulley needs to be cleaned, brushed, or otherwise acted upon as the band rides onto and leaves the pulley.

Further, it will be evident that, although it is desirable for the brush to be formed in one annular unit as shown and described, it could be divided into a plurality of segments, each individually mounted on the pulley—in which event, replacement might be easier and perhaps less expensive, since the entire circle of the brush bristles might not wear uniformly, thus necessitating replacement of only a portion of the entire brush.

What is claimed as my invention is:

1. In combination: a pulley having a rim; means mounting the pulley for rotation about its axis; an elongated flexible element trained over said rim and having stretches thereof tangent to the pulley rim; brush means having bristles; and means mounting the brush on the pulley for rotation therewith and with the bristles of the brush means spaced radially outward of the pulley rim and projecting in a common direction generally parallel to the axis about which the pulley turns to have brushing engagement with said stretches of the flexible element as the pulley turns and said flexible element rides onto and leaves the pulley rim.

2. In combination: an endless flexible element; a pulley having a rim and mounted for rotation about its axis, said flexible element being trained over the rim of the pulley and having stretches thereof tangent to the pulley rim; annular brush means of a diameter larger than that of the pulley rim; and means mounting said brush means for rotation about the axis of the pulley, with a part of the brush means overlying part of the portion of the flexible element on the pulley rim, so that upon rotation of the brush means the brush means has brushing engagement with said stretches of the flexible element.

3. In combination: an endless saw band having a cutting edge; a pulley having a rim and mounted for rotation about its axis, the saw band being trained over the rim of the pulley and having stretches thereof tangent to the pulley rim; a brush having its bristles arranged in a circle, the diameter of which is larger than that of the pulley rim; and means mounting the brush for rotation about the axis of the pulley with the end portions of its bristles overlying the cutting edge of the portion of the saw band on the pulley rim, so that upon rotation of the brush its bristles have brushing engagement with the cutting edge of said stretches of the saw band.

4. The combination of claim 3, wherein the means for mounting the brush also constrains it to turn with the pulley.

5. In combination: an endless saw band having a cutting edge; a pulley having a rim; means mounting the pulley for rotation about its axis, the saw band being trained over and guided by the rim of the pulley and having stretches thereof tangent to the pulley rim, the cutting edges of said stretches lying in a common plane which is normal to the axis of the pulley; brush means having bristles; means mounting the brush means on the pulley with its bristles generally parallel to the axis about which the pulley turns and projecting in the same direction towards and beyond said plane so as to have brushing engagement with the cutting edge of said stretches of the saw band as the band rides onto and leaves the pulley rim.

6. In a machine having an endless cutting band, and means to guide and drive the band for linear travel of a stretch thereof through the work zone of the machine, including a pulley onto which said stretch of the band rides after leaving said work zone, means to clean said stretch of the band before it rides onto the pulley, comprising: a rotary brush having bristles facing in a common direction with the ends of the bristles lying in substantially a common plane; means mounting the brush for rotation about an axis normal to said common plane and parallel with the axis of the pulley and with its bristles in brushing engagement with said stretch of the band; and means providing a connection between the the pulley and the rotary brush through which rotation of the pulley effects rotation of the brush.

7. In a machine having an endless cutting band with a cutting edge, means to guide and drive the cutting band for linear travel of a stretch thereof through the work zone of the machine including a pulley onto which said stretch of the band rides after it leaves the work zone, means to clean said stretch of the band before it rides onto the pulley, comprising: a rotary brush having its bristles arranged in a circle, the diameter of which is larger than that of the pulley, with the bristles of the brush facing in a common direction generally parallel to the axis of the brush; and means mounting the brush for rotation about the axis of said pulley with the end portions of its bristles overlying the cutting edge of the portion of the band on the pulley so that upon rotation of the brush its bristles have brushing engagement with the cutting edge of said stretch of the band.

8. The structure of claim 7, wherein the rotary brush and the pulley are connected to turn in unison.

9. In combination: a pulley having a rim adapted to have a flexible element trained thereabout; a brush having bristles facing in a common direction and arranged in a circle, the diameter of which is larger than that of the pulley rim; means providing an axially slidable connection between the pulley and the brush by which the brush and the pulley are held coaxial with one another, with the brush bristles facing the pulley rim; and means to adjust the relative axial positions of the pulley rim and brush, so that the brush bristles may be positioned to have different degrees of brushing engagement with the tangent stretches of a flexible element trained over the pulley rim as said element rides onto and leaves the pulley rim, and whereby wear of the brush bristles may be compensated.

References Cited in the file of this patent

UNITED STATES PATENTS

| | | |
|---|---|---|
| 337,647 | Allington | Mar. 9, 1886 |
| 619,490 | Lawrence | Feb. 4, 1899 |
| 1,438,540 | McKenna | Dec. 12, 1922 |
| 2,879,813 | Wilkie | Mar. 31, 1959 |

FOREIGN PATENTS

| | | |
|---|---|---|
| 652,832 | Germany | Nov. 9, 1937 |